(No Model.) 2 Sheets—Sheet 1.

E. A. SPERRY.
POWER GEARING FOR ELECTRIC CARS.

No. 560,375. Patented May 19, 1896.

Witnesses.
L. P. Abell
John B. Lyon

Inventor.
Elmer A. Sperry (No Model.) 2 Sheets—Sheet 2.

E. A. SPERRY.
POWER GEARING FOR ELECTRIC CARS.

No. 560,375. Patented May 19, 1896.

Witnesses.
L. P. Abell.
John B. Linn.

Inventor.
Elmer A. Sperry.

UNITED STATES PATENT OFFICE.

ELMER A. SPERRY, OF CLEVELAND, OHIO, ASSIGNOR, BY MESNE ASSIGNMENTS, TO THE GENERAL ELECTRIC COMPANY, OF NEW YORK.

POWER-GEARING FOR ELECTRIC CARS.

SPECIFICATION forming part of Letters Patent No. 560,375, dated May 19, 1896.

Application filed June 6, 1894. Serial No. 513,634. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Power-Gearing for Electric Cars, of which the following is a specification.

My invention relates to improvements in power-gearing for motor-trucks, and relates to the method of support and of inclosing such gearing, especially where the motor is allowed freedom and independence of movement.

My invention is fully described and illustrated in the following specification and accompanying drawings, the novel features thereof being specified in the claims annexed to the said specification.

Figure 1:
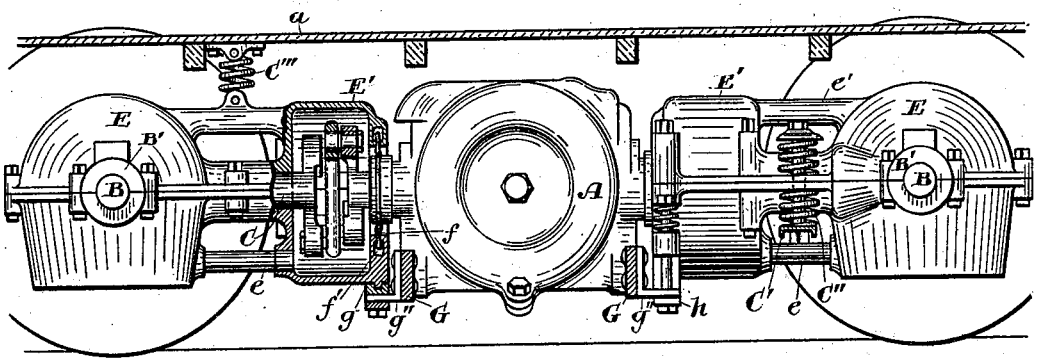
Figure 2:
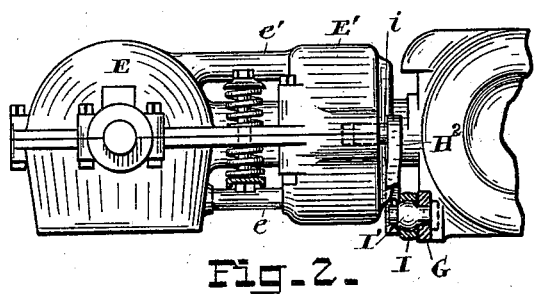
Figure 3:
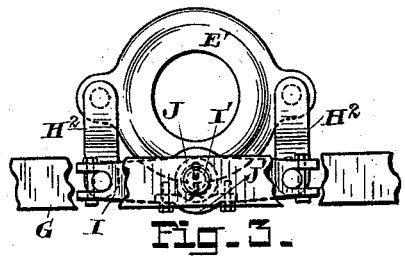
Figures 4, 5:
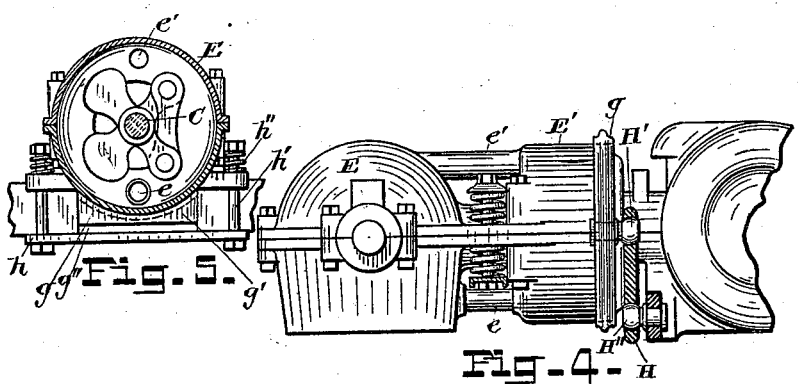
Figure 6:
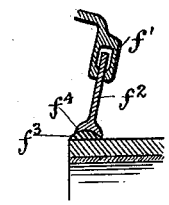
Figure 7:
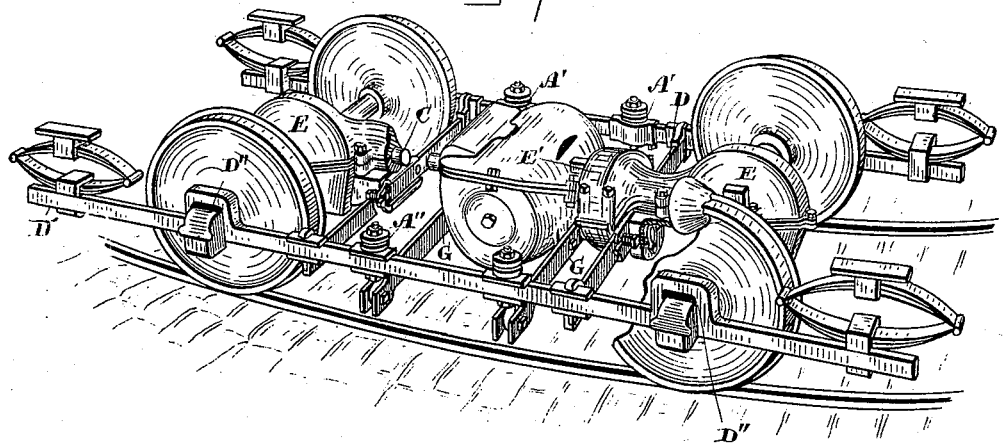
Figure 8:
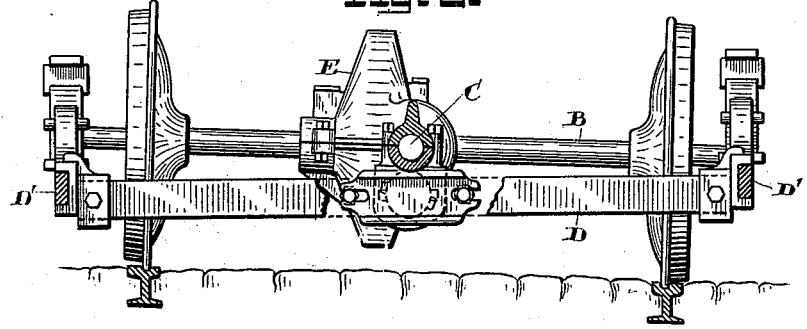
Figure 9:
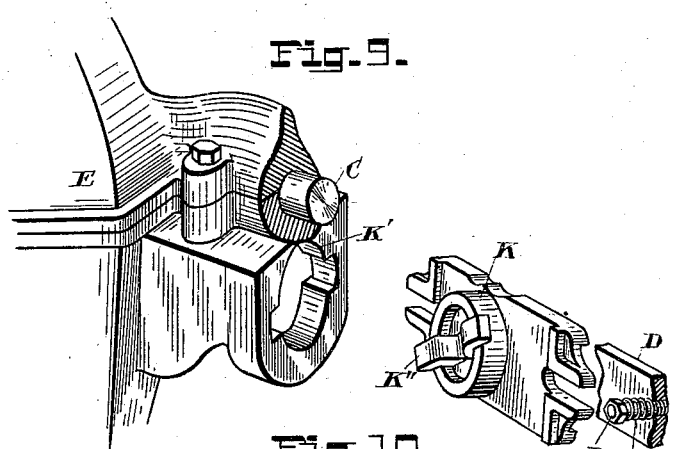
Figure 10:
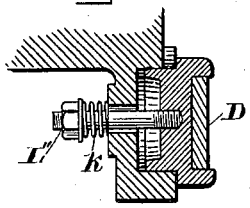

Figure 1 is a side elevation, partially in section. Figs. 2 and 3 show an alternate form of support where a swiveling bar is employed as part of support. Fig. 4 shows a ring inclosing the end of the housing. Fig. 5 is a transverse section of coupling-casing, showing coupling. Fig. 6 is an alternate form of oil-inclosing joint. Fig. 7 is an isometrical view. Figs. 8, 9, and 10 are views of alternate forms of support.

Like letters of reference indicate similar parts throughout the several views.

The motor A is supported from the axles B B. A yielding joint A' A', forming a part of such support, is shown in Fig. 7 and consists of a resilient medium, such as the rubber cushion $A^2$. A power-transmitting device of any well-known form, consisting in part of the shaft C, may be employed between the motor and the axle B, and said shaft may extend in the opposite direction from the motor, connecting the same to each axle, as is shown in Figs. 1 and 7. Owing to the independence of movement between the motor and the axle a universal coupling forms, preferably, a part of the power-transmitting device shown in Figs. 1 and 5. This coupling may be of any well-known form—for instance, such as is shown in application Serial No. 490,696, filed November 11, 1893. The transmitting device or coupling is preferably inclosed to guard against dirt, retain lubrication, prevent noise, &c., and when so inclosed it may be supported in various ways, several forms of support being shown in the drawings. One method is to support it directly from the motor-bar supporting the motor, as is illustrated in various details on first sheet of the drawings, or it may be supported by an independent transverse bar D, as shown on the second sheet, which bar rests upon the axles through the truck-frame D', Figs. 7 and 8. The casings may be compound and consist of two parts, (indicated by E surrounding the gearing and E' surrounding the coupling.) When made separate, they are in communication by the aperture through which the shaft C passes, and may be further connected by the tube or passage $e$ and a third passage $e'$. (Shown by the tube forming a part of the casing in the upper part of the figures.) The apertures of these tubes are shown at $e$ $e'$, Fig. 5. The housings are preferably made in halves bolted together for ease of attachment.

It has been found that successful power-driving connection for street-car motor-trucks would have to accommodate itself to very unusual and extreme movements of the truck parts. For instance, the axles are required to deviate considerably both ways from parallelism in a horizontal plane. They are also required to work at times in planes which are at an angle to each other, and, what is more as to this position, the planes sometimes do not intersect within the length of the axle, but at a point in the projection of their axes quite considerably removed therefrom. Furthermore, a longitudinal motion of each axle must be present, which was unexpectedly found to vary considerably with different loads owing to the spring of the truck. This applies to almost all the various constructions of trucks, either for single or double truck cars. The elastic medium or yielding joint between the truck-frame and the axle is indicated at D'', Fig. 7. To accommodate the various movements, I have devised the following details of support: An extra cross-bar C' of the truck supports the springs C'', upon which the case rests, or the support may be effected by the spring C''', extending from above the casing to the car-floor or other superposed structure $a$. The support from near the center of gravity allows the weight of these axle-mounted masses as a whole to be spring-supported rather than resting their weight upon the journal-bearings B' of the casing. The case would therefore move with the axle, and loose or lost motion, resilience, and yielding joints are shown to accommodate this motion and prevent its being transmitted to the motor when the motor is used as the supporting part or to allow of its taking place freely and without strain upon the journal B' when the support is other than the motor or the motor-bars. These bars are indicated by G, Figs. 4 and 7, which sustain a yielding connection with the truck D', or the yielding connection may be located anywhere between the axle and the motor—as, for instance, the medium D'', Fig. 7. A yielding portion of the wall of the casing is also provided to render the joint tight and at the same time permit of the motions above described. This may be accomplished by a number of methods—for instance, the flexible disk $f$, secured at one edge, say its inner edge, and sliding within a slot in the coöperating portion, (shown as being the casing,) which slot may lead to an open space, as $f'$, Figs. 1 and 6; or the disk may be rigid, as $f^2$, and be flexibly mounted either by a flexible portion near either edge or the joints indicated at $f^3 f^4$, which will turn and slide. Either of these constructions accommodate equally well the transverse, angular, and limited rotary motions of any of them.

Turning now to the support between the housing and the motor or motor-supports G, it will be seen that various details are shown, all accomplishing the same object. A circular face is provided at $g$, Figs. 1 and 5, between the casing and segmental slide $g'$. The under face of the slide is flat and rests loosely upon the guide $g''$, secured to the motor. A strip $h$, bolts $h'$, and spring $h''$ constitute the remaining portion of the connection. Fig. 4 shows an alternate form of this connection where the circular face $g$ encircles the casing and the support, involving a link H—for instance, one on each side coöperating with the pins H' of the ring and H'' upon the motor. The bearings of these pins may be of any suitable form. Ball-and-socket bearings are shown. The alternate form shown in Figs. 2 and 3 consists in a swivel-bar I, swiveling upon the pin I' intermediately between its ends, shown located centrally and sustaining a link connection to the casing by links H² H². An important form of this support consists in substantially the swiveling bar I or its equivalent and any means of providing for the lateral or transverse movement of the housing in reference thereto. The one shown is the rocking of the links in either direction from their central position shown in the drawings; but other means will readily suggest themselves, and the invention extends to their use; or the swiveling pin may be mounted upon the housing and the transverse or sliding motion may take place between it and the motor or truck supporting elements. A slipping joint is shown at $i$, where the pin of the link enters the casing, and between the pin I' and the swivel there may exist an elastic medium consisting of the rubber insertion J, surrounding the pin, the same being contained in the cavity secured by the cap J'. The form of support illustrated on the second sheet of the drawings involves a swivel about the short pin K, which enters an aperture K', integral with the housing, and is secured by the locking-lugs K''. With this mounting the swivel itself has a sliding connection with the cross-bar of the truck D, which, it will readily be understood, may or may not be independent of the motor-bar G. It is, however, shown as independent in these figures. The bolt L and spring L' serve to more firmly hold the parts in position. In lieu of the locking-lugs K'' the bolt L'' and spring $k$ may be employed. (See Fig. 10.)

The use and operation of the devices will be readily understood from the foregoing. Fig. 8 shows the relative position of the axle and truck parts when for any reason through the spring of the truck or yielding joint provided, for instance, between the axle-box and the truck-frame shown in Fig. 7 the axle and truck are out of alinement as to horizontal plane. The movements taking place have been described above and are accommodated by the inclosing joint and the yielding side of the housing $f$ or $f^2$. The operation of the support shown in Figs. 1 and 5 will be understood as follows: The rotary motion takes place at the joint $g$, the angular, transverse, and longitudinal motions taking place on the surfaces of the support $g''$, as it will be seen that the joints at this point can pull apart or slide in either direction with reference to each other. The universal features shown in Fig. 4 will be readily understood.

With reference to the form of support illustrated in Figs. 2 and 3 the small rotary movement about the axis of the casing takes place through the parallel motion, consisting of the links H² H² and swivel-bar I, being about the pin I'. The longitudinal movement results from the case slipping along on the pins $i$, the transverse motion through the swinging of the links H² H², and the angular movement through the working of the swivel-bar I upon the ball I' at its center, through the yielding qualities of the resilient medium J, or both acting in conjunction, as will be readily understood. The various movements taking place in the form of support shown in Figs. 8, 9, and 10 will be readily understood from the foregoing.

Having fully described my invention, what I claim as new, and desire to secure by Letters Patent, is—

1. In a motor-car, a motor, the running-gear of the car, power-driving connection from the motor to the running-gear, a yielding coupling forming part of said connection, and a casing inclosing said yielding coupling, said casing being integral with the journal-bearing of the power-driving connection.

2. In a power-transmitting device for a vehicle, the combination with a motor and an axle for the vehicle, of a power-transmitting device extending from the motor to the axle, a yielding coupling forming a part of said device, and an inclosing casing for said device supported at its center of gravity.

3. In a power-transmitting device for a vehicle, the combination with a motor, and an axle for the vehicle, of a power-transmitting device extending from the motor to the axle, a yielding coupling forming a part of said device, an inclosing casing for said device, and springs supporting said casing at its center of gravity.

4. In a power-transmitting device for a vehicle, the combination with a motor, and an axle for the vehicle, of a power-transmitting device extending from the motor to the axle, and a casing inclosing said device provided with a chamber at each end and passages connecting said chambers, substantially as described.

5. In a power-transmitting device, the combination with a vehicle-axle, of a motor, gearing on the axle, power connections between the motor and the gearing, a yielding coupling forming part of said connections, a casing having chambers inclosing the gearing and the coupling, and oil-circulation tubes at the upper and lower portions of said casing, between said chambers.

6. In a power-transmitting device for a vehicle, a motor, an axle for the vehicle, a yielding support between the two, a frame rigidly attached to the motor, a power-transmitting device extending from the motor to the axle, a yielding coupling forming a part of the power-transmitting device, an inclosing casing for the said power-transmitting device mounted upon the axle and extending toward the motor, an additional support for the casing secured to the motor-support, and means for comparatively small relative movement between the support and the casing.

7. In a power-transmitting device for a vehicle, a motor, an axle for the vehicle, a yielding support between the two, a power-transmitting device extending from the motor to the axle, a yielding coupling forming a part of such power-transmitting device, an inclosing casing for the said power-transmitting device mounted upon the axle and extending toward the motor, an additional support for the casing secured to the motor-support, and means for relative movement between the support and the casing substantially about the axis of the power-transmitting device.

8. In a power-transmitting device for a vehicle, a motor, an axle for the vehicle, a yielding support between the two, a power-transmitting device extending from the motor to the axle, a yielding coupling forming a part of the power-transmitting device, an inclosing casing for such power-transmitting device mounted upon the axle and extending toward the motor, an additional support for the casing secured to the motor-support, and means for relative movement of the casing of the power-transmitting device.

9. In a power-transmitting device for a vehicle, a motor, an axle for the vehicle, a yielding support between the two, a power-transmitting device extending from the motor to the axle, a yielding coupling forming a part of the power-transmitting device, an inclosing casing for such power-transmitting device mounted upon the axle and extending toward the motor, an additional support for the casing secured to the motor-support, and means for small relative movement of the casing in a line parallel with the axle.

10. In a power-transmitting device for a vehicle, a motor, an axle for the vehicle, a yielding support between the two, a power-transmitting device extending from the motor to the axle, a yielding coupling forming a part of the power-transmitting device, an inclosing casing for the said power-transmitting device mounted upon the axle and extending toward the motor, and an additional support for the casing secured to the motor-support and constituting a universal joint.

11. In a power-transmitting device for a vehicle, a motor, an axle for the vehicle, a yielding support between the two, a power-transmitting device extending from the motor to the axle, a yielding coupling forming a part of the power-transmitting device, an inclosing casing for the said power-transmitting device mounted upon the axle and extending toward the motor, an additional support for the casing secured to the motor-support, and a resilient medium as a part of such support.

12. In a power-transmitting device for a vehicle, a motor, an axle for the vehicle, a yielding support between the two, a power-transmitting device extending from the motor to the axle, a yielding coupling forming a part of the power-transmitting device, an inclosing casing for the said power-transmitting device mounted upon the axle and extending toward the motor, and two independent additional supports for the said casing, one of which is secured to the motor-support.

13. In a power-transmitting device for a vehicle, a motor, an axle for the vehicle, a yielding support between the two, a power-transmitting device extending from the motor to the axle, a yielding coupling forming a part of the power-transmitting device, an inclosing casing for the said power-transmitting device mounted upon the axle and extending toward the motor, and two independent additional supports for the casing, one of which consists in part of a resilient medium, the other being secured to the motor-support.

14. In a power-transmitting device for a vehicle, a motor, an axle for the vehicle, a yielding support between the two, a power-transmitting device extending from the motor to the axle, a yielding coupling forming a part of the power-transmitting device, an inclosing casing for the said power-transmitting device mounted upon the axle and extending toward the motor, and a bar swiveling at a point intermediate between its ends constituting an additional support for the casing.

15. In a power-transmitting device for a vehicle, a motor, an axle for the vehicle, a yielding support between the two, a power-transmitting device extending from the motor to the axle, a yielding coupling forming a part of the power-transmitting device, an inclosing casing for the said power-transmitting device mounted upon the axle and extending toward the motor, a bar swiveling at a point intermediate between its ends, and means for lateral motion between the casing and the bar.

16. In a power-transmitting device for a vehicle, a motor, an axle for the vehicle, a yielding support between the two, a power-transmitting device extending from the motor to the axle, a yielding coupling forming a part of the power-transmitting device, an inclosing casing for the said power-transmitting device mounted upon the axle and extending toward the motor, a bar swiveling at a point intermediate between its ends, a stationary pin forming such swivel, and a resilient medium between the bar and the swivel constituting an additional support for the casing.

17. In a power-transmitting device for a vehicle, a motor, an axle for the vehicle, a yielding support between the two, a power-transmitting device extending from the motor to the axle, a yielding coupling forming a part of the power-transmitting device, an inclosing casing for the said power-transmitting device mounted upon the axle and extending toward the motor, a bar swiveling at a point intermediate between its ends, a stationary pin forming such swivel, a resilient medium between the bar and the swivel, and a cap for retaining the medium in position constituting an additional support for the casing.

18. In a power-transmitting device for a vehicle, a motor, an axle for the vehicle, a yielding support between the two, a power-transmitting device extending from the motor to the axle, a yielding coupling forming a part of the power-transmitting device, an inclosing casing for the said power-transmitting device mounted upon the axle and extending toward the motor, a swiveling bar, a pin upon which such bar swivels, a bushing upon said pin, and a resilient medium between the bushing and the bar.

19. In a motor-truck, the combination with a spring-supported motor, of a cross-bar rigidly secured to the truck-frame, a horizontal pin movable on said bar lengthwise of the same, and a bearing in the motor-frame adapted to fit and turn on said pin.

20. In a motor-truck, the combination with a spring-supported motor having in its frame a cylindrical bearing whose axis is lengthwise of the truck, of a cross-bar rigidly secured to the truck-frame, a pin having slotted ears, bolts passing through said slots into said bar, and means for keeping the pin in engagement with the bearing in the motor-frame.

21. In a power-transmitting device, two journals mounted for limited relative movement, a casing extending from one journal to the other, a flexible disk forming part of such casing, in combination with a clamp for one edge of the disk.

22. In a power-transmitting device, two journals mounted for limited relative movement, a casing extending from one journal to the other, a flexible disk forming part of such casing, in combination with a grooved portion for one edge of the disk and a clamp for the other.

23. In a power-transmitting device, two journals mounted for limited relative movement, a casing extending from one journal to the other, a flexible disk forming part of such casing, in combination with a grooved portion attached to one of the journals and a clamp for the edge of the disk attached to the other journal.

ELMER A. SPERRY.

Witnesses:
H. JOHNSON,
M. NIELSON.